United States Patent
Bause et al.

(10) Patent No.: US 9,967,600 B2
(45) Date of Patent: May 8, 2018

(54) MULTI-CHANNEL DIGITAL CONTENT WATERMARK SYSTEM AND METHOD

(75) Inventors: Thomas Bause, Brooklyn, NY (US); Sheau Ng, Wayland, MA (US)

(73) Assignee: NBCUniversal Media, LLC, Wilmington, DE (US)

( * ) Notice: Subject to any disclaimer, the term of this patent is extended or adjusted under 35 U.S.C. 154(b) by 1500 days.

(21) Appl. No.: 13/116,703

(22) Filed: May 26, 2011

(65) Prior Publication Data

US 2012/0300971 A1 Nov. 29, 2012

(51) Int. Cl.
| H04K 1/10 | (2006.01) |
| H04N 21/236 | (2011.01) |
| H04N 21/8358 | (2011.01) |
| H04N 21/2389 | (2011.01) |
| H04N 21/434 | (2011.01) |
| H04N 21/4385 | (2011.01) |
| H04L 9/30 | (2006.01) |

(52) U.S. Cl.
CPC . *H04N 21/23614* (2013.01); *H04N 21/23892* (2013.01); *H04N 21/4348* (2013.01); *H04N 21/43853* (2013.01); *H04N 21/8358* (2013.01)

(58) Field of Classification Search
CPC .... G06F 21/10; H04L 63/0457; H04L 9/3247
USPC ....... 380/33, 207, 255, 28; 386/260; 705/57; 713/176
See application file for complete search history.

(56) References Cited

U.S. PATENT DOCUMENTS

| 6,411,725 B1* | 6/2002 | Rhoads | G06F 17/30876 375/E7.089 |
| 6,611,607 B1* | 8/2003 | Davis | G06F 17/30876 348/E7.061 |
| 7,227,971 B2* | 6/2007 | Nagao | H04N 7/17318 348/E7.071 |
| 2002/0049580 A1* | 4/2002 | Kutaragi | G06F 21/10 704/1 |
| 2002/0120849 A1* | 8/2002 | McKinley | G06F 17/30817 713/176 |
| 2003/0190157 A1* | 10/2003 | Aubry | H04N 5/76 386/232 |
| 2004/0064702 A1* | 4/2004 | Yu | G06T 1/0028 713/176 |
| 2005/0234728 A1* | 10/2005 | Tachibana | G10L 19/097 704/273 |
| 2005/0240767 A1* | 10/2005 | Lemma | G06T 1/0028 713/176 |
| 2006/0059509 A1* | 3/2006 | Huang | H04N 21/235 725/32 |

(Continued)

*Primary Examiner* — Gary S Gracia
(74) *Attorney, Agent, or Firm* — Fletcher Yoder, P.C.

(57) ABSTRACT

A multi-channel embedded data technique allows for embedding data, such as watermarks into multiple channels of audio, video, multi-media, and other digitized content streams. Two or more of the channels may be utilized. The embedded data may be segmented within each channel, and these segments may start and stop at identical times, or may be staggered or offset from one another. The available payload may be used for different data, or redundant data, providing enhanced reliability. Staggering allows for more rapid availability of at least some of the embedded data segments. References may be used between channels and between data streams to provide for highly complex configurations of encoding and decoding of the embedded data.

23 Claims, 5 Drawing Sheets

(56) References Cited

U.S. PATENT DOCUMENTS

| | | | |
|---|---|---|---|
| 2006/0133624 A1* | 6/2006 | Waserblat | H04H 60/04 381/119 |
| 2006/0239503 A1* | 10/2006 | Petrovic | H04L 9/002 382/100 |
| 2007/0081789 A1* | 4/2007 | Winick | G11B 27/105 386/229 |
| 2007/0112837 A1* | 5/2007 | Houh | G06F 17/30247 |
| 2008/0062315 A1* | 3/2008 | Oostveen | G10L 25/48 348/500 |
| 2009/0044242 A1* | 2/2009 | Ramakrishnan | H04N 7/162 725/118 |
| 2009/0074185 A1* | 3/2009 | Srinivasan | G10L 19/018 380/255 |
| 2009/0074242 A1* | 3/2009 | Yamamoto | H04N 21/23892 382/100 |
| 2010/0103950 A1* | 4/2010 | Statelov | H04N 21/234327 370/468 |
| 2010/0138730 A1* | 6/2010 | Olafsen | H04L 41/0654 714/819 |
| 2010/0150154 A1* | 6/2010 | Viger | H04L 12/4633 370/389 |
| 2010/0239117 A1* | 9/2010 | Sartor | G06T 1/0021 382/100 |
| 2010/0242079 A1* | 9/2010 | Riedl | H04N 7/17318 725/115 |
| 2010/0246810 A1* | 9/2010 | Srinivasan | G10L 19/018 380/28 |
| 2011/0106542 A1* | 5/2011 | Bayer | G10L 21/04 704/500 |
| 2011/0129201 A1* | 6/2011 | McLean | H04N 5/782 386/296 |
| 2011/0167390 A1* | 7/2011 | Reed, Jr. | G06F 17/30017 715/854 |
| 2011/0174137 A1* | 7/2011 | Okuyama | G10H 1/0041 84/600 |
| 2011/0257980 A1* | 10/2011 | Gao | G10L 21/038 704/500 |
| 2011/0286625 A1* | 11/2011 | Petrovic | H04L 9/002 382/100 |
| 2011/0299605 A1* | 12/2011 | Price | H04N 19/85 375/240.26 |
| 2012/0008912 A1* | 1/2012 | Stevens | H04N 5/76 386/237 |

* cited by examiner

MULTI-CHANNEL DIGITAL CONTENT WATERMARK SYSTEM AND METHOD

BACKGROUND

The present invention relates generally to digital content, and more particularly to techniques for embedding information into digital content, such as watermarks.

Conventional audio, video and multimedia content distribution and storage is largely based today upon digital technologies. In accordance with these technologies, audio-only, video-only, combinations of these, as well as text, still images, and so forth are encoded by bit streams that may be created, manipulated, separated, combined, stored, disseminated and played in a wide range of contexts. These contexts include, for example, broadcast for television viewing, over airwaves, satellite links, cable links, and so forth, as well as storage on recording media, such as physical and solid state memory.

In certain of these techniques, it has become increasingly important to embed certain types of data that does not, itself, represent the content. That is, certain bits in bit streams may represent the audio, video or similar content that is reproduced for the audience, while other code may provide information relating to the content. One type of data, for example, may include watermarks. Digital watermarks are defined by code which may be transmitted, stored, and remain resident with the code defining the underlying content, and that may be read or extracted when desired. Uses for such watermarks include, for example, tracking of content, identification of particular content, policing content for piracy, referencing and identifying content for the provision of additional content, products and/or services, and so forth. The watermarks themselves may simply be identifying code, or may transmit data or metadata relating to the content itself, such as for identifying the content, identifying particular portions of the content, and so forth. More generally, however, such embedded supplementary code may serve any of a range of purposes, that may relate directly to the content or to other functions, such as instructions, information, program updates, and so forth.

Known techniques for embedding watermarks and similar code into digital content have traditionally been limited to the use of a single channel. That is, the content may be stored and transmitted as a single channel of data. In such cases, the embedded code is simply stored in the single data stream. However, even where multiple channels are utilized, watermarks are typically stored in only one of these channels. While in most cases this may be sufficient, the amount of the data stream which can be allocated to the embedded data is typically quite limited, limiting in turn, the ultimate payload of the embedded data. There is a need, in the field, for improved techniques for embedding data, such as watermarks, into digital content.

BRIEF DESCRIPTION

The present invention provides novel techniques designed to respond to such needs. The present techniques may be employed with any suitable digital content, including audio content, video content, multi-media content, and so forth. The technique makes use of multiple channels available in such content to embed code, such as watermarks, metadata, instruction data, and so forth. The code may be different in the different channels, or may be redundant, or partially different and partially redundant. Moreover, the placement of the code and the multiple channels may fall at identical times, or portions of the code may begin and end at different points in the different channels. References may be made in one or more of the channels to data in the other channels, providing a low bandwidth data transmission capability by virtue of the multiple channels.

Hence, in accordance with one aspect of the invention, a method for providing embedded data in a multi-channel digital content stream comprises identifying in the multi-channel digital content stream at least one first segment of at least a first channel and at least one second segment of a second channel. The content stream is then altered to provide a first portion of the embedded data in the first segment, and a second portion of the embedded data in the second segment.

The invention also provides method for providing embedded data in a multi-channel digital content stream that comprises receiving the multi-channel digital content stream in an electronic device, the multi-channel digital content comprising content data for reproducing desired content and embedded data in the content data. The embedded data comprises at least a first portion embedded in a first segment of a first channel and a second portion embedded in a second segment of a second channel. The first and second portions of the embedded data are then read from the first and second segments.

The invention also offers a system for providing embedded data in a multi-channel digital content stream. The system includes a content embedding component configured to identify in the multi-channel digital content stream at least one first segment of at least a first channel and at least one second segment of a second channel, and to insert a first portion of the embedded data into the first segment, and a second portion of the embedded data into the second segment. Means are provided for transmitting the multi-channel digital content stream, including content data for reproducing desired content and the embedded data, to an electronic device for reproduction of the desired content.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
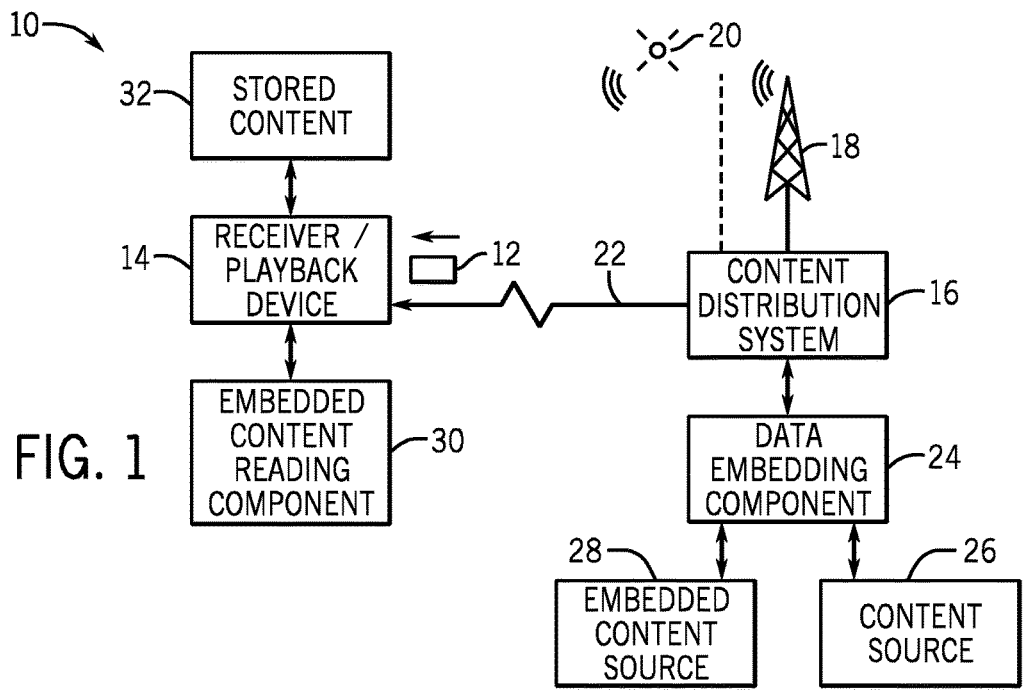
FIG. 1 is a diagrammatical representation of an exemplary digital content distribution system that may make use of the multi-channel code embedding techniques described in the present discussion.

Referring to the drawings, FIG. 1 represents an exemplary digital content distribution and playback system 10 that may be used with the digital content and embedded content techniques described in the present discussion. A wide range of system components and system designs may be envisaged, depending upon the nature of the content and its distribution and use. Several such techniques are illustrated diagrammatically in FIG. 1. For example, the content is represented by reference numeral 12, and will typically include a data stream that encodes both the digital content itself as well as the embedded content or code. Although illustrated as a packet 12, the content data stream itself may be transmitted overtime, stored in various media, or a combination of these. The system illustrated includes a receiver/playback device 14 which is intended to represent any electronic device capable of receiving the content code and making use of the content code. In most contexts, this will include a system capable of either rendering the content. By way of example, audio content may be received and/or stored and played back for a user of the device. The same is true of video and multimedia content. Certain types of content, such as digitized books, and similar content may be played on the device typically displayed in segments for the appreciation of the device user. The system further includes a content distribution system 16 which transmits the content in any suitable form to the receiver/playback device 14. In the illustrated embodiment, certain technologies are represented diagrammatically, such as digital broadcast 18, satellite broadcast 20, and cable transmission 22. However, it should be borne in mind that these time-based transmissions may be "broadcast" in nature in a sense that they constitute a transmission to an entire target audience at once, or may be a type of unicast transmission, such as through the Internet. More generally, however, the content distribution system 16 may provide content to device 14 through physical media, such as electronic memory supports, optical disks, flash memory, and so forth. The latter may be "non-real time" content in the sense that it may be downloaded, stored, or otherwise accessible for later rendering (on the device, on another component, or on a service).

The content distribution system 16 makes use of a data embedding component 24 that receives underlying digitized content from a content source 16 and embedded content from an embedded content source 28. The data embedding component 24 may draw content from a content library, such as a repository of movies, television programs, electronic books and magazines, and so forth. The embedded content source 28 provides a code that will be combined with the underlying content from source 26 by the data embedding component 24. The data embedding component 24 is discussed in greater detail below.

The receiver/playback device 14 may include or work in conjunction with an embedded data reading component 30. This component is capable of analyzing the digital content 12 to read the embedded code in multiple channels as discussed below. Technologies for both embedding the code and reading the code may include any existing technology.

In particular, the embedded code may define digital watermarks, or may be any suitable code that can be embedded in, transmitted with and store with the underlying digital content. The receiver/playback device 14 may also work in conjunction with a device for storing content as indicated by reference numeral 32. Such devices may be included in the receiver/playback device 14, such as in the form of programmable memory. In other contexts, the storage device may comprise, for example, a CD or DVD reader (or reader/writer), a computer memory, an in-set recording device, a remote recording device or service, and so forth. It should also be noted that the receiver/playback device 14 may include a wide range of devices, such as television sets, computers, handheld computers and tablets, smart phones, and so forth.

Figure 2:
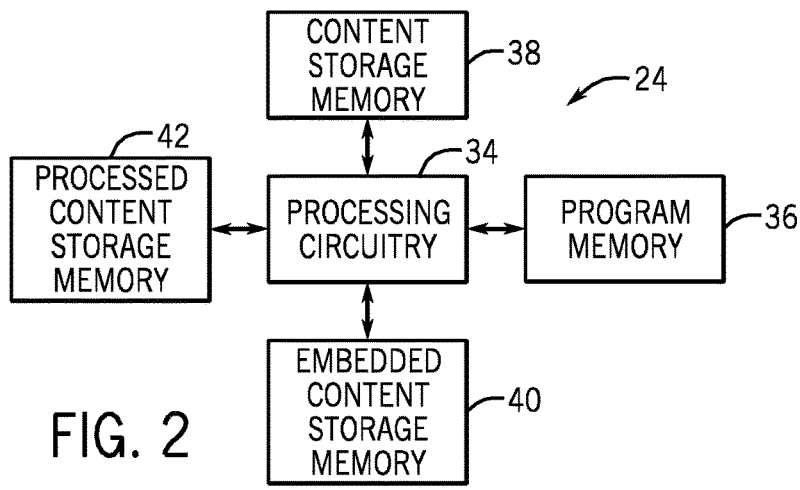
FIG. 2 is a diagrammatical representation of certain of the functional circuitry that may be used for embedding data in a multi-channel data stream.

FIG. 2 illustrates certain components that may be included in the content embedding component 24. In the illustrated embodiment, these include processing circuitry 34 that includes or is provided with program memory 36. The program memory 36 allows the processing circuitry 34 to execute routines stored in the memory for embedding the supplementary content into the base content. The processing circuitry 34 may include, for example, one or more conventional computer processors. Moreover, content storage memory 38 may be provided for at least temporarily storing the content into which the embedded content is to be added. Similarly, embedded content storage memory 40 may be provided for at least temporarily storing the embedded content to be combined with the base content. Finally, processed content storage memory 40 may be provided for at least temporarily storing the combined content. In practical applications, the processed content containing the underlying content and the embedded content may be created well in advance of transmission to one or more receiver/playback devices. In such cases, entire libraries may be formed of base content and embedded content, such as content that describes or defines the base content, such as watermarks. In such cases, the content distribution system discussed above may draw upon such process content storage memory at the time required for transmitting the processed content to one or more devices.

Figure 3:
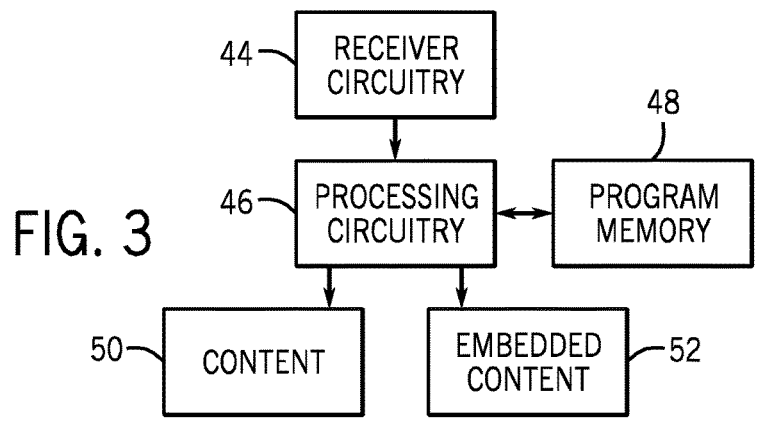
FIG. 3 is a diagrammatical illustration of certain functional components that may be used for reading underlying content and embedded content or data in such scenarios.

FIG. 3 illustrates a similar diagrammatical representation of certain of the functional components that may be included in the receiver/playback device and/or components functioning with it, particularly the embedded content reading component 30 discussed above. In the illustrated embodiment, receiver circuitry 44 serves to receive or access the content that includes the underlying content and the embedded content. Processing circuitry 46 serves to reading the embedded content from the underlying content, and will carryout instructions stored in program memory 48 within the processing circuitry or coupled to the processing circuitry. The processing circuitry then executes known routines for reading embedded content, and may distinguish the basic 50 and the embedded content 52. The content 50 may then be played on the receiver/playback device in any manner in which it is intended, depending upon the nature and type of content (e.g., audio, video, multimedia, text, etc.). The embedded content may be used for various purposes. In particular, the embedded content may serve to identify the underlying content, such as for policing of piracy, digital rights management, instructions for playback or manipulation of the underlying content, special offers of products and/or services, and so forth. One particular technique for policing piracy of digital content which may be used in conjunction with the embedded content is described in U.S. patent application Ser. No. 12/847,930, filed on Jul.

30, 2010, in the name of Bause et al., and entitled Metadata/content Re-association System and Method, which is hereby incorporated into the present disclosure by reference. Other use cases that may benefit from such embedded content include those described in U.S. patent application Ser. No. 13/101,643, filed on May 5, 2011, in the name of Wilkinson et al., and entitled Multi-tiered Automated Content Recognition and Processing; and U.S. patent application Ser. No. 12/635,229, filed on Dec. 10, 2009, in the name of Ng et al., and entitled Viewer-personalized Broadcast and Data Channel Content Delivery System and Method, both of which are also hereby incorporated into the present disclosure by reference.

Figure 4:
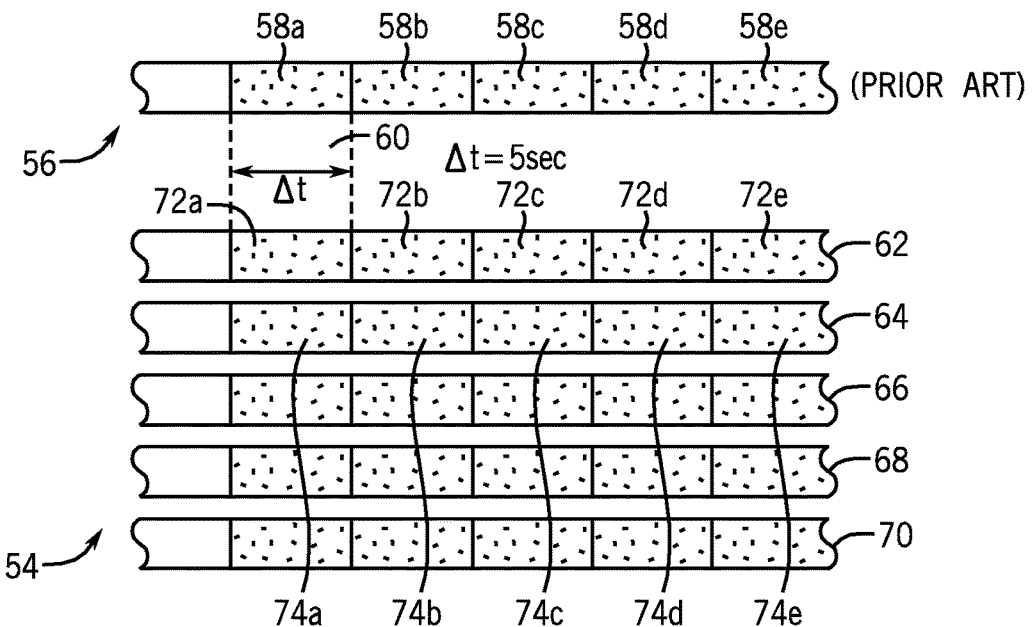
FIG. 4 is a diagrammatical representation of an exemplary multi-channel digital content stream having embedded data in each of a plurality of channels.

FIG. 4 illustrates an exemplary technique for embedding code, such as watermarks into multi-channel digital content streams. The multi-channel content stream is indicated by reference numeral 54, and is illustrated as including five channels. These may be, for example, audio channels designed for multi-channel playback (e.g., surround sound). However, it should be borne in mind that any type of channels may be used, such as audio channels, video channels, channels containing text, and so forth, and these various types may be used together as parallel channels capable of receiving and encoding embedded data along with underlying content. FIG. 4 also illustrates a prior art data stream that includes a single channel in which a code is embedded. The single channel 56 of the prior art may be considered to include one or more segments 58a-58e, each of which may include embedded data. In the illustrated embodiment, each segment 58a-58e has a pre-determined run length as indicated by reference numeral 60, such as five seconds. It should be noted that the run length, or the particular duration or extent of the embedded code may vary considerably depending upon the nature of the underlying data, the amount of embedded data desired, and so forth. The particular duration of five seconds for each segment used in the present discussion is intended to be exemplary only. As may be seen in FIG. 4, the prior art technique allows for various code to be stored in each segment, but is essentially one-dimensional. The codes stored in each segment may depend upon the desired information to be conveyed, and the strategy for conveying the information. For example, only one or multiple of the segments may be utilized, and data stored in each segment may be the same or different.

Figure 5:
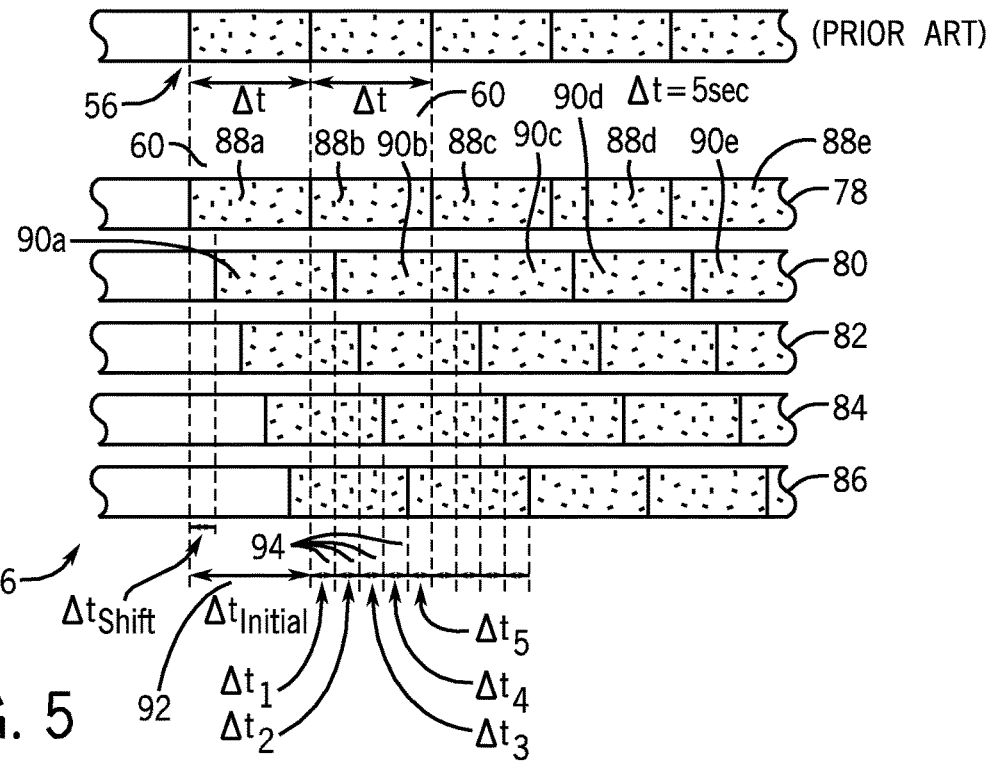
FIG. 5 is a similar diagrammatical representation illustrating time-shifting of such embedded data.

In the case of the multi-channel content stream 54, two or more of the channels may be utilized for storing embedded data. In this sense, the multi-channel content stream provides a multi-dimensional medium for transmission, storage and use of enhanced payloads of embedded data. In particular, the stream illustrated in FIG. 4 includes first, second, third, fourth and fifth channels, designated by reference numerals 62, 64, 66, 68 and 70, respectively. Each of these channels may include multiple segments into which embedded code may be inserted, as indicated by reference numerals 72a-72e and 74a-74e. In a practical application, all of the parallel channels may carry embedded code, or only certain of the channels may carry such code. Moreover, it should be noted that not all segments available for the embedded code need be used. Still further, each of the segments may carry different code, greatly enhancing the available payload, or certain of the segments may carry the same code, providing redundancy and enhanced reliability by virtue of such redundancy. In the simple form illustrated in FIG. 4, for example, if each segment is considered to have an embedded code or watermark capacity of 50 bits, the set of five channels allows for a 250 bit payload with no redundancy. If complete redundancy were provided in all five channels, reliability may be considered to be improved by a factor of 5 (i.e., false negative/false positive rate). As illustrated in FIG. 5, similar techniques may be used with time-shifting between the channels. The illustration of FIG. 5 is similar to that of FIG. 4, wherein a prior art data stream 56 is illustrated along with a multi-channel content stream 76 according to the present technique. Here again, multiple channels 78, 80, 82, 84 and 86 are illustrated and each channel is capable of carrying embedded code in segments 88a-88e and 90a-90e (it should be noted that while in FIGS. 4 and 5 individual segments for only two of the channels have been separately labeled, such segments exist and may be utilized for all channels).

While each channel illustrated in FIG. 5 may carry embedded code, the start and stop locations or times of segments of code in each channel may be staggered or displaced to provide additional benefits. That is, an initial period or run length 92 may be provided for segments in one channel, such as channel 78, with subsequent segments following. In the illustrated embodiment, however, such segments for the other channels are staggered in time or stream location as indicated by offset time durations 94. Such techniques may allow for more densely embedding the payload of data. This may improve the granularity at which the embedded data (e.g., watermark) can be placed into or read out of media content. In the illustrated embodiment, each segment has a duration of five seconds, while the shift or offset 94 is one second. The time at which the data can be read by the reading circuitry, reading all five channels simultaneously can be calculated in accordance with the relationship:

$$\Delta t_{extract} = \frac{\sum_{i=0}^{n} \Delta t_i}{n}.$$

That is, following the initial delay for reading of the first segment in the first channel at the beginning of the content, data may be read every second following, in this example. An even or identical time-shift between the channels may be maintained but is not necessary. Indeed, an unequal succession of time-shifted segments of embedded data can be exploited for content protection applications as it could be seen as coding of information over time. In the case of identical time-shifts, the system would allow reading of data based upon a fixed pattern. This may increase performance of the system as it is not required to search for the data. The next segment of data can be read at the time-shift duration in the next channel after the last data is read.

Figure 6:
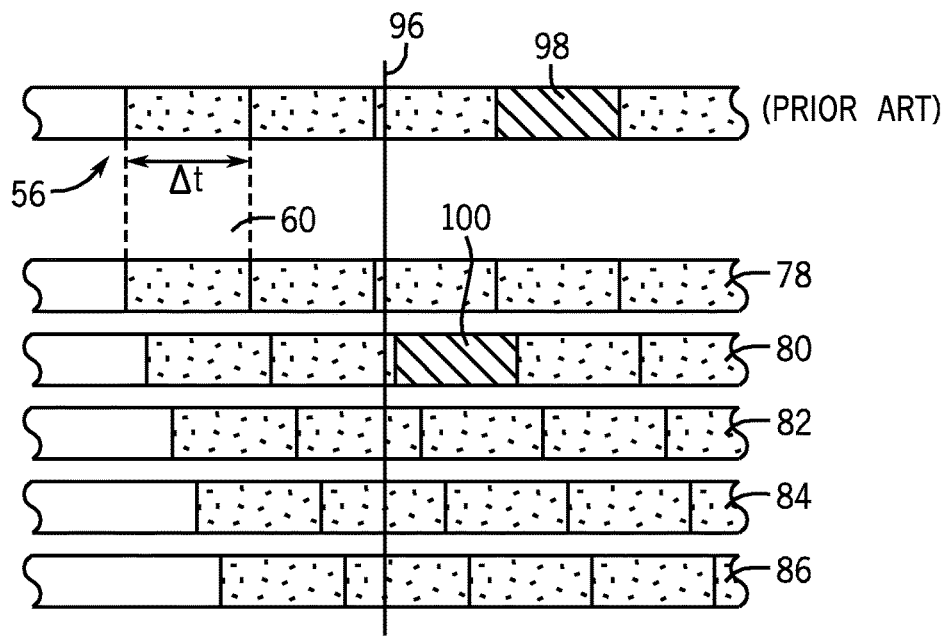
FIG. 6 is a similar representation illustrating how time-shifted embedded data may improve upon availability of the data as compared to existing techniques.

FIG. 6 illustrates a further advantage of the time-shifted multi-channel embedded content approach. In particular, given the channels and time-shifting scheme outlined in FIG. 5, if it is assumed that a user changes input stream (i.e., enters the illustrated stream) at a time 96, in a conventional prior art approach, the next available full segment of embedded data may be represented by reference numeral 98. This may occur nearly a full segment duration after the data stream is entered. On the other hand, using the time-shifted, multi-channel approach, at least one full segment will become available much sooner as indicated by reference numeral 100. Indeed, it is most likely that, where multiple channels are considered, multiple full segments of data will be read before a single segment was read in the single channel of the prior art.

As mentioned above, it should be emphasized that the non-uniform or unequal shifting of data embedded in the multiple channels may itself comprise information. This may allow for the transmission of very low bandwidth messages that are detectable only by monitoring the shift between the embedded data. Moreover, it should be noted that this may allow for transmission of certain information by virtue of the embedded code itself, and additional, supplementary or complimentary information by virtue of the selected time-shift between segments of code.

Figure 7:
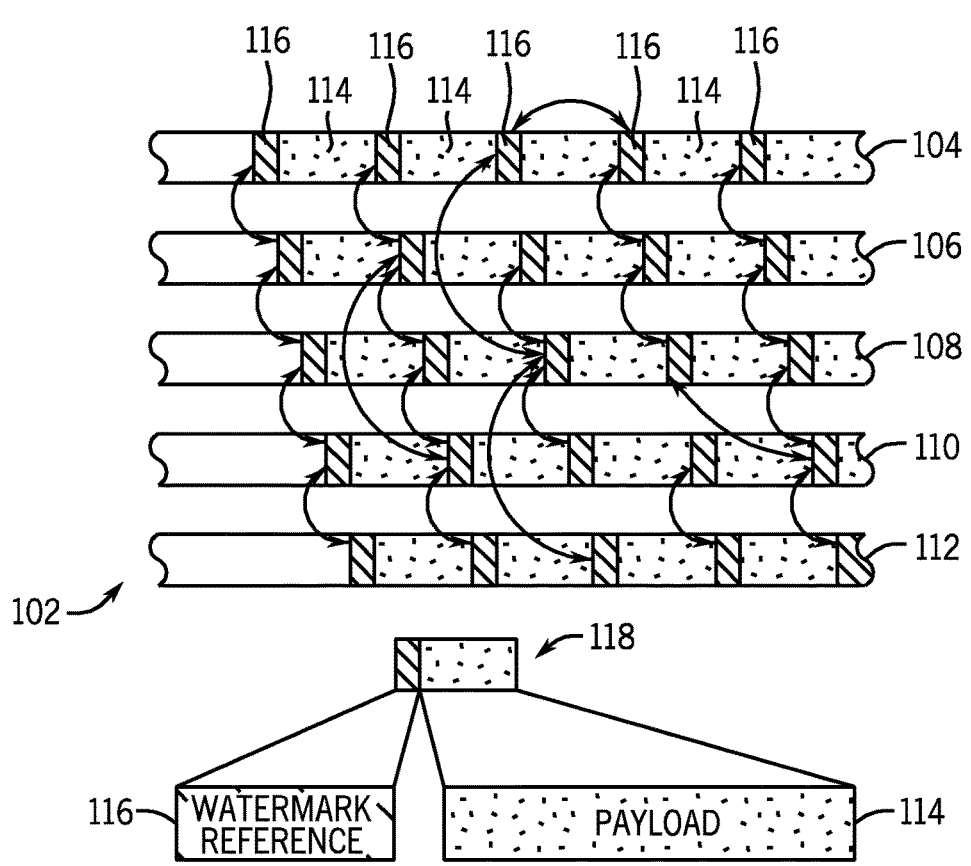
FIG. 7 is a further diagrammatical representation of data embedded into multiple channels of digital content having self references as part of the embedded data.

Still further, the present techniques allow for what may be highly complex interaction of embedded code between multiple channels. FIG. 7 illustrates an exemplary embodiment of such coupling. In this case, coupling of the embedded data is carried out through references made in the embedded data payload. References in the payload can be used to link segments of embedded code in the channels to embedded code in other channels of the stream. In the illustration of FIG. 7, for example, a multi-channel content stream 102 includes channels 104, 106, 108, 110 and 112. Each channel, in turn, includes payload segments 114 and reference segments 116. The combination of the reference segment and the payload segment may be considered to constitute the net payload segment 118, which segments may be transmitted at the same time or at staggered times in accordance with the techniques described above. It should be noted that not all segments or channels or segments of all channels need carry such references. Where provided, references may be made between segments of different channels as illustrated by the arrows in FIG. 7. Such inter-referencing may allow for complex combinations of the embedded data, such as to form strings of data which would not be reconstructable other than by the references. Although not illustrated, it should also be noted that intra-channel references may also be utilized.

Figure 8:
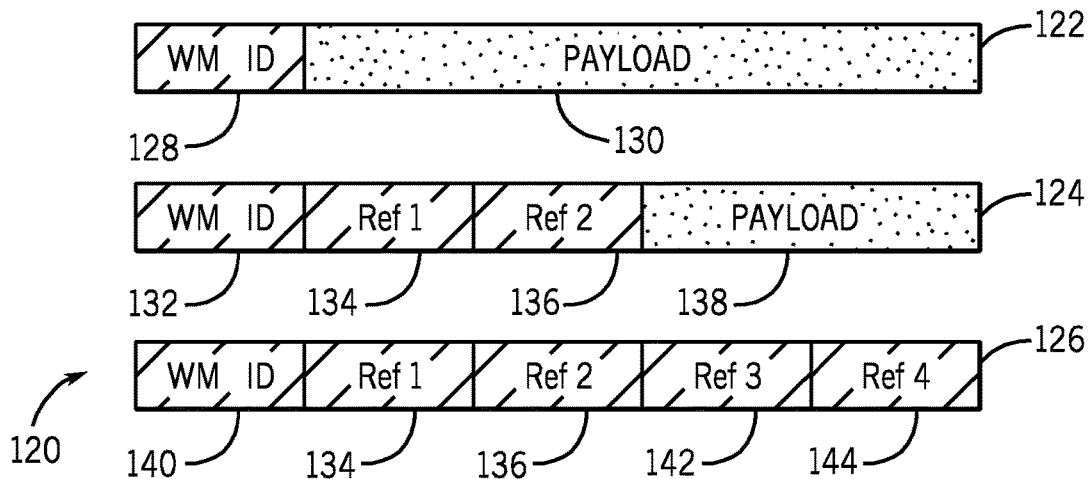
FIG. 8 illustrates several possible techniques for utilizing such references.

FIG. 8 illustrates certain embedded data configurations 120 that may be utilized in a referenced multi-channel scheme of the type illustrated in FIG. 7. Three such configurations are illustrated, designated by reference numerals 122, 124 and 126. In the first, an embedded code identification 128 is provided, along with a payload 130 that may constitute the desired data, or a portion of it. In the second configuration, a code identification 132 is also provided, but two references 134 and 136 are also provided along with a segment of payload 138. In the third configuration, an identifying segment 140 is provided, but the rest of the entire available payload is occupied by references, 134 and 136, similar to those of the second configuration, and further references 142 and 144. Some or all of these configurations may be utilized to provide inter-channel (and intra-channel) references for conveying the desired information in the available payload.

Figure 9:
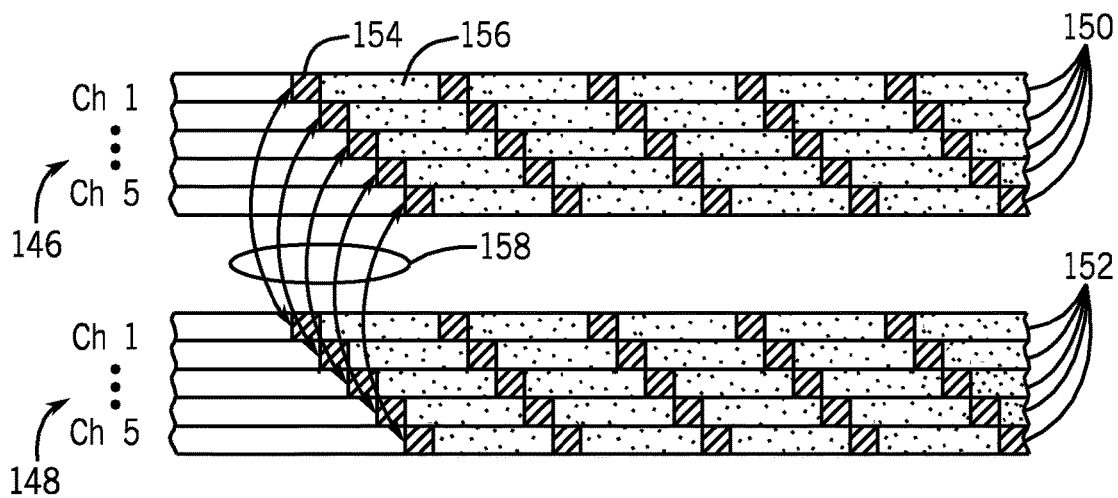
FIG. 9 represents further possibilities for referencing between multiple data streams.

The present techniques may be similarly utilized to provide information between multiple multi-channel content streams, as illustrated in FIG. 9. In this case, two separate streams 146 and 148 are provided, each of which comprises multiple channels 150 and 152 respectively. The embedded data here is again divided into segments, and these segments are staggered as described above, although need not be the case. Each segment again includes identifying and referencing information as indicated by reference numeral 154, and payload data 156. It should be noted, however, that this information may be highly configured to include both desired payload and references as described below. Some or all of the references, then, may be made between the data streams as indicated by reference numeral 158.

Figure 10:
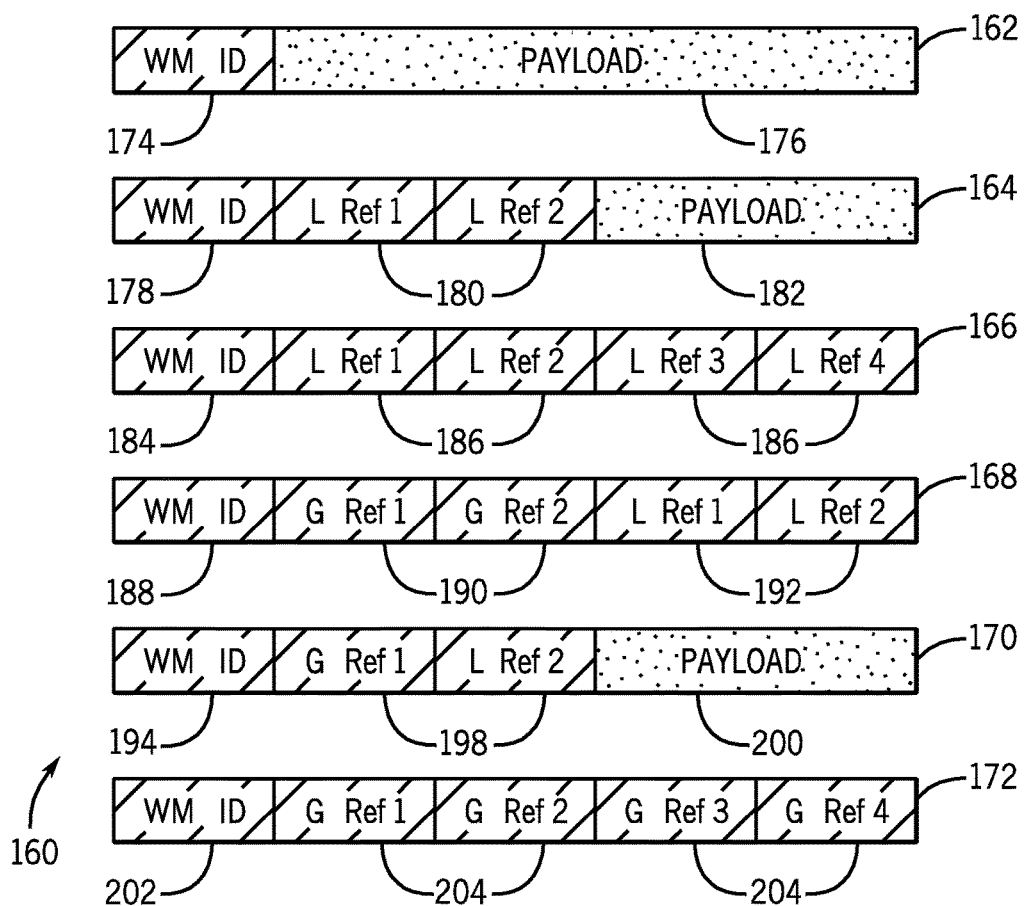
FIG. 10 represents extended watermark configurations that may use payloads of content in certain portions and references in other portions.

FIG. 10 illustrates certain configurations for this type of loading. The configurations, represented generally by reference numeral 160 may include configurations 162, 164, 166, 168, 170 and 172. Here again, these are only examples of the types of payload and reference loading that may be available and used. In the first example 162, for example, a code ID 174 is provided along with a payload section 176 of desired data. In the second example 164, and identification 178 is again provided, but with two "local" references 180 and a payload segment 182. These local references may be references to other channels within the same data stream. In configuration 166, an identification 184 is again provided, but with the entire available payload being utilized by references 186 to other channels. In configuration 168, an identification 188 is followed by one or more "global" references 190 to other data streams, and one or more local references 192 to channels within the same data stream.

In configuration 172, following an identification 202, multiple global references 204 are provided to one or more other data streams.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for providing embedded data in a multi-channel digital content stream, comprising:
   identifying, via a processor, at least one first segment of at least a first channel in the multi-channel digital content stream and at least one second segment of a second channel in the multi-channel digital content stream;
   generating a time shift that provides a low bandwidth message;
   embedding a first portion of data of the embedded data in the first segment at a first start location and a first stop location in accordance with the generated time shift for providing the low bandwidth message; and
   embedding a second portion of data of the embedded data in the second segment at a second start location and a second stop location in accordance with the generated time shift for providing the low bandwidth message, wherein the first start location and the first stop location associated with the first portion of data is time-shifted with respect to the second start location and the second stop location of the second portion of data;
   wherein at least one of the first and second portions of the embedded data comprises a reference to data embedded in a different channel.

2. The method of claim 1, wherein at least one of the first and second portions of embedded data comprises multiple references to data embedded in at least one different channel.

3. The method of claim 1, wherein at least one of the first and second portions of embedded data comprises a reference to data embedded in a different multi-channel digital content stream.

4. The method of claim 1, wherein at least one of the first and second portions of embedded data comprises a global reference to data embedded in at least one different channel and wherein at least one of the first and second portions of embedded data comprises a local reference to data embedded in the same channel.

5. A method for providing embedded data in a multi-channel digital content stream, comprising:
   identifying, via a processor, at least one first segment of at least a first channel in the multi-channel digital content stream and at least one second segment of a second channel in the multi-channel digital content stream, the first and second segment having beginning points and ending points;

generating a time shift that provides a low bandwidth message;

embedding a first portion of data of the embedded data in the first segment at a first start location and a first stop location in accordance with the generated time shift for providing the low bandwidth message; and embedding a second portion of data of the embedded data in the second segment at a second start location and a second stop location in accordance with the generated time shift for providing the low bandwidth message, wherein the first start location and the first stop location associated with the first portion of data is time-shifted with respect to the second start location and the second stop location of the second portion of data;

wherein at least one of the first and second portions of the embedded data comprises a reference to data embedded in a different channel.

6. The method of claim 5, wherein at least one of the beginning and the ending points of the first and second segments are the same.

7. The method of claim 5, wherein the length of the first and second segments are different.

8. The method of claim 6, comprising embedding data into multiple first segments of the first channel and embedding data into multiple second segments of the second channel, and wherein beginning and ending points of the segments in at least one of the first and second channels are non-uniform.

9. The method of claim 5, wherein at least one of the first and second portions of embedded data comprises multiple references to data embedded in at least one different channel.

10. The method of claim 5, wherein at least one of the first and second portions of embedded data comprises a reference to data embedded in a different multi-channel digital content stream.

11. The method of claim 5, wherein the embedded data comprises digital watermark data that facilitates identification of digital content defined by the multi-channel digital content stream.

12. The method of claim 5, comprising transmitting the multi-channel digital content to an electronic device.

13. The method of claim 12, wherein the multi-channel digital content is stored on the electronic device or on a component coupled to the electronic device.

14. The method of claim 12, comprising reading the embedded data from the first and second segments in the electronic device or in a component coupled to the electronic device.

15. A method for providing embedded data in a multi-channel digital content stream, comprising:

receiving the multi-channel digital content stream in an electronic device, the multi-channel digital content comprising content data for reproducing desired content and embedded data in the content data, the embedded data comprising at least a first portion embedded in a first segment of a first channel and a second portion embedded in a second segment of a second channel, wherein the first portion of at least one first segment is time-shifted with respect to the second portion of at least one second segment in accordance with a time shift for providing a low bandwidth message;

detecting the low bandwidth message based on the time shift between the first portion of the embedded data and the second portion of the embedded data; and reading the first and second portions of the embedded data from the first and second segments;

wherein at least one of the first and second portions of the embedded data comprises a reference to data embedded in a different channel.

16. The method of claim 15, wherein the first and second portions of the embedded data are read in the electronic device.

17. The method of claim 15, wherein the embedded data facilitates identification of digital content defined by the multi-channel digital content stream.

18. A system for providing embedded data in a multi-channel digital content stream, comprising:

a content embedding component configured to identify in the multi-channel digital content stream at least one first segment of at least a first channel and at least one second segment of a second channel, to generate a time shift that provides a low bandwidth message, to insert a first portion of the embedded data into the first segment in accordance with the generated time shift for providing the low bandwidth message, and to insert a second portion of the embedded data into the second segment in accordance with the generated time shift for providing the low bandwidth message, wherein the first portion of at least one first segment is time-shifted with respect to the second portion of at least one second segment; and a content distribution system configured to transmit the multi-channel digital content stream, including content data for reproducing desired content and the embedded data, to an electronic device for reproduction of the desired content;

wherein at least one of the first and second portions of the embedded data comprises a reference to data embedded in a different channel.

19. The system of claim 18, comprising a reading component in or coupled to the electronic device for reading the embedded data from the multi-channel digital content stream.

20. The system of claim 18, wherein the content distribution system is configured to transmit the multi-channel digital content stream via a broadcast medium, a satellite transmission medium or a cable transmission medium.

21. The system of claim 18, wherein the content distribution system is configured to transmit the multi-channel digital content stream via the Internet.

22. The system of claim 18, comprising a storage component that stores the multi-channel digital content stream, including the content data and the embedded data, prior to transmission to the electronic device.

23. The system of claim 18, where in the storage component is configured to store a plurality of different multi-channel digital content streams, each including respective content data and the embedded data.

* * * * *